June 7, 1949. J. GANGEMI 2,472,699
FRUIT AND VEGETABLE SLICER
Filed Sept. 18, 1946 2 Sheets-Sheet 1

INVENTOR.
JOHN GANGEMI
BY
ATTORNEY

June 7, 1949. J. GANGEMI 2,472,699
FRUIT AND VEGETABLE SLICER
Filed Sept. 18, 1946 2 Sheets-Sheet 2
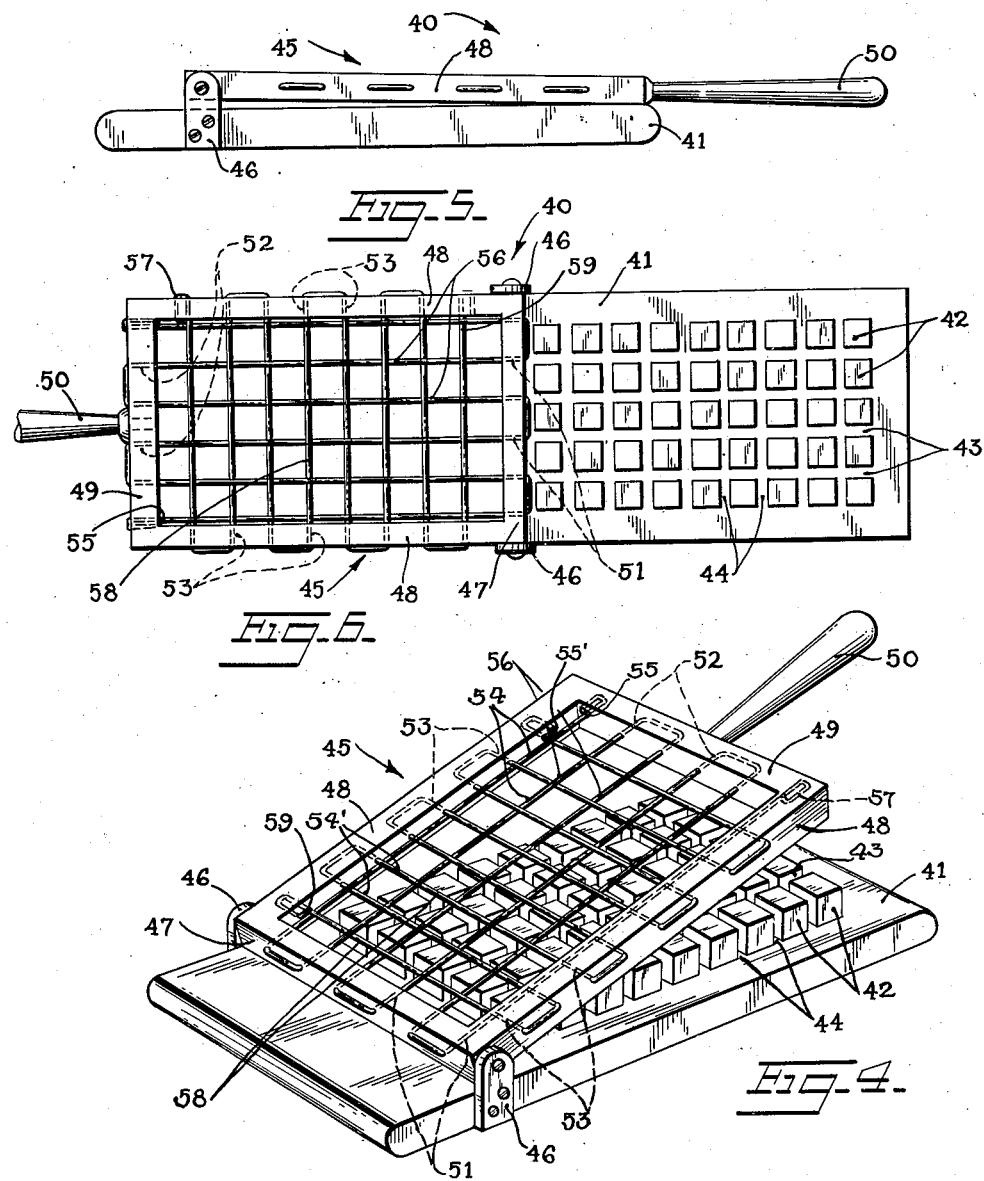
INVENTOR.
JOHN GANGEMI
BY
ATTORNEY Patented June 7, 1949

2,472,699

UNITED STATES PATENT OFFICE 2,472,699

FRUIT AND VEGETABLE SLICER

John Gangemi, Corona, N. Y.

Application September 18, 1946, Serial No. 697,650

1 Claim. (Cl. 146—147)

The present invention concerns a slicer for fruits or vegetables and refers more particularly to a slicer of the type in which wires are strung on a frame hinged to a grooved board and caused to pass through the article to be sliced by moving the frame pivotally downward onto the board and into the grooves.

An object of the present invention is to provide an improved fruit slicer.

Another object is to provide a slicer with novel means for maintaining equal and proper tension in the wires.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Fig. 4 is a perspective view of a modified form of my invention.

Fig. 5 is a side elevational view of the same.

Fig. 6 is a plan view of the same in open position.

Referring now in detail to the drawings, the improved slicer 10 comprises a board 11 on which are mounted a plurality of slicing blocks 12 extending longitudinally thereof and separated by the longitudinal grooves 13.

Figure 1:
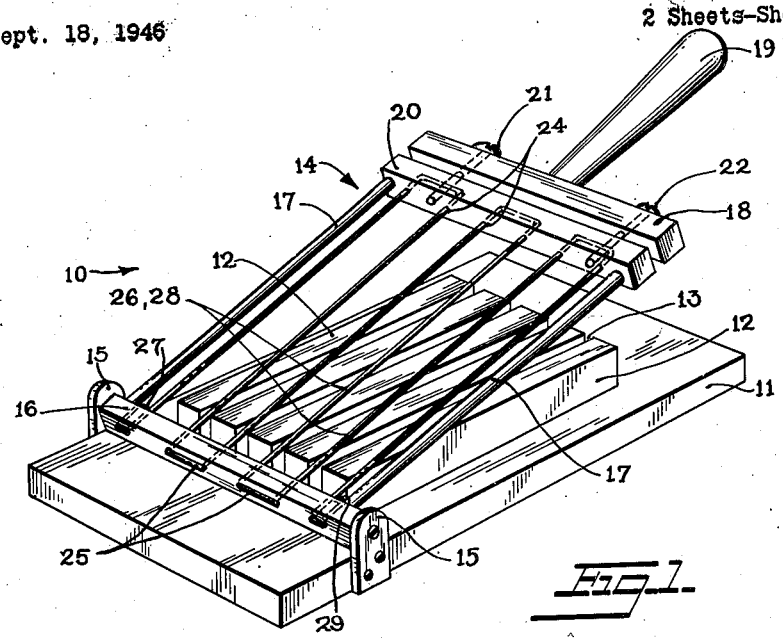
Fig. 1 is a perspective view of the preferred form of my invention.
Figure 2:
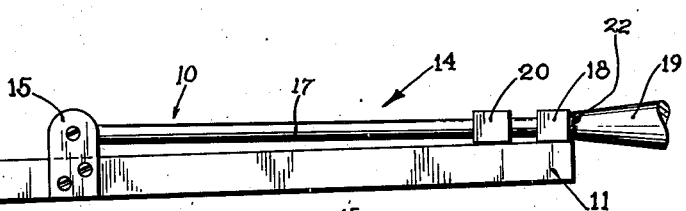
Fig. 2 is a side elevational view of the same.
Figure 3:
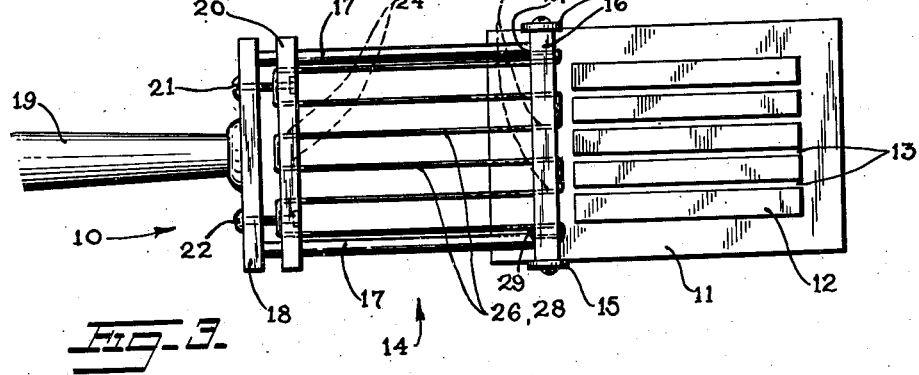
Fig. 3 is a plan view of the slicer in open position.

A slicing frame 14 is pivotally mounted on board 11 between standards 15 and is free to swing substantially through a semi-circle, as seen by a comparison of Figs. 2 and 3. Frame 14 comprises the pivot bar 16 pivotally mounted in standards 15, side rods 17 extending substantially perpendicularly therefrom and firmly connected thereto, handle bar 18 firmly connected to rods 17 and extending substantially parallel to pivot bar 16 and handle 19 mounted on handle bar 18.

Slidably mounted on side rods 17 and extending substantially perpendicularly thereto is tension bar 20. Two screws 21 and 22 substantially at opposite ends of tension bar 20 extend therefrom slidably through and beyond handle bar 18.

A multiplicity of holes 24 extend transversely through tension bar 20 and are aligned with corresponding holes 25 in pivot bar 16. A single wire 26 is looped through an end hole 25, anchored to itself at 27 and passes successively through the corresponding hole 24, back through the adjacent hole 24 to the corresponding hole 25 and so on to form a multiplicity of substantially parallel, loopedly interconnected lengths 28 extending between pivot bar 16 and tension bar 20, being finally looped through the other end hole 25 and anchored to itself at 29.

By tightening screws 21 a substantially equal tension is developed in all the lengths 28 of wire 26, since each end of tension bar 20 on being drawn up pivots slightly about the screw 21, if it is being drawn up by screw 22, and vice versa. Perfectly even tension in lengths 28 results due to the fact that all the lengths 28 are interconnected and greater tension on one of them results in a sliding of wire 26 through holes 24 and 25 until perfectly even tension is established.

The slicer 40 shown in Figs. 4, 5 and 6 embodies my invention in modified form. The board 41 comprises raised, substantially cubical bodies or blocks 42 between which extend the substantially longitudinal grooves 43 and the substantially transverse grooves 44.

A substantially rectangular slicing frame 45 is pivotally mounted on standards 46 on board 41 for swinging motion through substantially a semi-circle as seen by a comparison of Figs. 5 and 6. Frame 45 comprises pivot bar 47 pivotally mounted in standards 46, side bars 48 firmly connected thereto and extending substantially perpendicularly therefrom, end bar 49 firmly connected to side bars 48 and extending substantially parallel to pivot bar 47, and handle 50 connected to end bar 49.

The bar 47 is formed with transverse holes 51 and bar 49 is formed with transverse holes 52, each hole 52 being aligned with a hole 51. The bars 48 are formed with transverse holes 53, corresponding holes being aligned with those in the opposite bar.

Two wires 54 and 54' are provided. Wire 54 is looped through an end hole 52 and anchored to itself as at 55 and passed through the opposite and corresponding aligned hole 51, passed to the adjacent hole 51 and back to the corresponding hole 52 and so forth until a multiplicity of longitudinal lengths 56 of wire 54 are strung on frame 45 and finally anchored as at 57. Wire 54' is similarly looped and anchored as at 55' and then passed through the holes 53 to similarly form a multiplicity of transverse lengths 58 of wire 54' on frame 45, terminating in a final looping and anchoring at 59.

The tension of wire 54 is equal in all lengths 56 and the tension of the wire 54' is equal in all the lengths 58 thereof and is properly set in manufacture.

The modified form of the invention is additionally useful for dicing or cubing fruits or vegetables.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

In a slicing device, a slicing frame comprising a pair of spaced bars extended parallel to each other, a pair of side rods extended between said spaced bars, a tension bar disposed between said spaced bars closely adjacent one of said bars, said tension bar and the other of said pair of bars being formed with aligned pairs of holes, a continuous length of wire having its ends anchored on the said other bar and having its intermediate portion laced through said aligned pairs of openings, and means for drawing said tension bar toward said one bar to draw said wire taut between said tension bar and the said other bar, said tension bar being formed at its ends with holes through which the intermediate portions of said side rods pass for slidably supporting said tension bar on said side rods for sliding movement toward the said one bar under the influence of said drawing means.

JOHN GANGEMI.

REFERENCES CITED

The following references are of record in the file of this patent:

UNITED STATES PATENTS

| Number | Name | Date |
|---|---|---|
| 112,911 | Fair | Mar. 21, 1871 |
| 328,995 | Andrews | Oct. 27, 1885 |
| 843,427 | Atkinson | Feb. 5, 1907 |
| 1,321,015 | Doak | Nov. 4, 1919 |
| 1,892,598 | Alderman | Dec. 27, 1932 |
| 2,073,257 | Van Riper | Mar. 9, 1937 |
| 2,108,972 | Orner | Feb. 22, 1938 |
| 2,240,221 | Locker | Apr. 29, 1941 |

FOREIGN PATENTS

| Number | Country | Date |
|---|---|---|
| 417,975 | Great Britain | Oct. 16, 1934 |
| 755,657 | France | Sept. 11, 1933 |